Patented Nov. 10, 1942

2,301,517

UNITED STATES PATENT OFFICE 2,301,517

CYANO-ISOPROPYL ETHERS OF CYANO-ALCOHOLS

Herman A. Bruson, Philadelphia, Pa., assignor to The Resinous Products & Chemical Company, Philadelphia, Pa., a corporation of Delaware No Drawing. Application November 12, 1941, Serial No. 418,854

6 Claims. (Cl. 260—464)

This invention relates to ω-cyano-isopropyl ethers of aliphatic cyano-alcohols and a method for their preparation.

I have found that cyano-alcohols possessing a primary or secondary hydroxyl group react in the presence of alkaline condensing agents with crotononitrile or allyl cyanide to form ω-cyano-isopropyl ethers of said cyano-alcohols. For example, crotononitrile or allyl cyanide in the presence of alkali react with β-hydroxy propionitrile in accordance with the following equations:

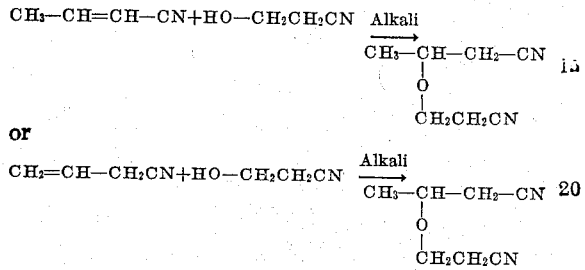

By using other primary or secondary cyano-alcohols in place of β-hydroxy propionitrile, analogous ω-cyano-isopropyl ethers of the cyano-alcohols can be obtained. For example, one may use α-hydroxy propionitrile or any of the monohydroxy or polyhydroxy butyronitriles or higher homologues thereof. Cyano-alcohols in which the alcoholic hydroxy group is tertiary are inoperative.

The alkaline condensing agents which can be used includes the oxides, hydroxides, amides, or alcoholates of the alkali metals. Other strong bases, such as quaternary ammonium hydroxides, can also be used. Of these, a particularly effective agent is aqueous 40% trimethyl benzyl ammonium hydroxide available commercially under the trade name "Triton B." Aqueous sodium hydroxide or potassium hydroxide solutions are effective condensing agents also. Only a small quantity of alkaline condensing agent is required, amounts of the order of 0.5 to 5% on the combined weight of the reactants being sufficient.

The condensation takes place readily at temperatures between about 0° C. and 80° C., although initial temperatures of 25° C. to 60° C. are preferred. Since the reaction is exothermic, it is generally desirable to start the reaction at a low temperature, and, when the initial reaction has subsided, to raise the temperature. To moderate the vigor of the reaction, it may be carried out in an inert solvent, such as dioxane, benzene, or tertiary butyl alcohol.

The products obtained are useful as intermediates for the preparation of resins and plasticizers.

The following examples illustrate the invention:

Example 1

(a) To a solution of 142 grams of β-hydroxy-propionitrile and 10 grams of aqueous 40% trimethyl benzyl ammonium hydroxide there was added dropwise 134 grams of allyl cyanide while the mixture was stirred and cooled to 40–45° C. After the addition, which required 1½ hours, the mixture was stirred for one hour at room temperature and finally heated at 60–70° C. for four hours. The mixture was cooled, neutralized with dilute hydrochloric acid and taken up in its own volume of ethylene dichloride to which about 25 cc. of water was added to effect a separation into layers. The ethylene dichloride layer was separated, and evaporated to dryness. The residual oil was distilled in vacuo. The fraction boiling at 148–158°/2–3 mm. was a colorless liquid weighing 135 grams. Upon redistillation at 10 mm., it boiled at 173–175° C. Its analysis corresponded to the compound

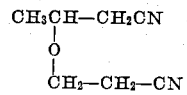

Its physical constants are:

Specific gravity at 25° C., 1.0223
$n^{25}_D$ 1.4405

(b) By using 134 grams of crotononitrile in place of the allyl cyanide above, the same product is obtained.

Example 2

To a solution of 84 grams of β-hydroxy-butyronitrile, 5 grams of aqueous 40% trimethyl benzyl ammonium hydroxide, and 20 grams of tertiary butyl alcohol, there was added dropwise 67 grams of crotononitrile or allyl cyanide while the reaction mixture was stirred and cooled to 40° C. The mixture was then heated for five hours at 65–70° C., and finally cooled, neutralized with dilute hydrochloric acid, and washed with water. The residual oil upon distillation in vacuo yields a colorless oil boiling at 140–145°/1 mm., corresponding to the formula

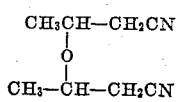

In a similar manner, one molecular equivalent each of allyl cyanide and α-hydroxypropionitrile condense in the presence of 1% by weight of 40% aqueous potassium hydroxide solution to yield $$\begin{array}{c} CH_3-CH-CH_2CN \\ | \\ O \\ | \\ CH_3-CH-CN \end{array}$$

as a colorless liquid.

In the same manner, allyl cyanide or crotononitrile can be condensed with α,γ-dihydroxy valeronitrile to yield the corresponding mono- or di-cyano-isopropyl ether thereof. Other aldehyde cyanhydrins, such as butyraldehyde cyanhydrin, octylaldehyde cyanhydrin, heptaldehyde cyanhydrin, and the like, also condense with allyl cyanide or crotononitrile to yield the corresponding ω-cyano-isopropyl ethers thereof.

I claim:

1. A method for preparing an ω-cyano-isopropyl ether of aliphatic primary and secondary cyano-alcohols which comprises condensing a member of the group consisting of primary and secondary aliphatic cyano-alcohols in the presence of an alkaline condensing agent with a member of the group consisting of allyl cyanide and crotononitrile.

2. A method for preparing the ω-cyano-isopropyl ether of β-hydroxy propionitrile which comprises condensing β-hydroxy propionitrile in the presence of an alkaline condensing agent with a member of the group consisting of allyl cyanide and crotononitrile.

3. A method for preparing the ω-cyano-isopropyl ether of β-hydroxy butyronitrile which comprises condensing β-hydroxy butyronitrile in the presence of an alkaline condensing agent with a member of the group consisting of allyl cyanide and crotononitrile.

4. As a new compound, an ω-cyano-isopropyl ether of a member of the group consisting of primary and secondary aliphatic cyano-alcohols.

5. The compound having the formula $$\begin{array}{c} CH_3CH-CH_2-CN \\ | \\ O \\ | \\ CH_2CH_2CN \end{array}$$

said compound being a colorless liquid boiling at 173–175° at 10 mm.

6. The compound having the formula $$\begin{array}{c} CH_3-CH-CH_2CN \\ | \\ O \\ | \\ CH_3-CH-CH_2CN \end{array}$$

said compound being a colorless liquid boiling at 140–145°/1 mm.

HERMAN A. BRUSON.